United States Patent [19]

Millington et al.

[11] Patent Number: 4,547,102

[45] Date of Patent: Oct. 15, 1985

[54] REAMER WITH ANGLED BLADE AND FULL LENGTH CLAMP

[75] Inventors: Douglas Millington, Sheffield; Peter W. W. Yewman, Chesterfield, both of England

[73] Assignee: Cogsdill Tool Products, Inc., Camden, S.C.

[21] Appl. No.: 643,757

[22] Filed: Aug. 23, 1984

Related U.S. Application Data

[63] Continuation of Ser. No. 417,399, Sep. 13, 1982, abandoned.

[30] Foreign Application Priority Data

Nov. 27, 1981 [GB] United Kingdom ................ 8135854
Feb. 2, 1982 [GB] United Kingdom ................ 8202946

[51] Int. Cl.⁴ ............................................. B23B 27/16
[52] U.S. Cl. .................................... 408/185; 408/181; 408/705; 408/713
[58] Field of Search ................... 407/35, 36, 37, 38, 407/39, 45

[56] References Cited

U.S. PATENT DOCUMENTS

| | | | |
|---|---|---|---|
| RE 30680 | 7/1981 | Kress et al. | 64/4 |
| 351,482 | 10/1886 | Almond | 408/186 |
| 552,065 | 12/1895 | King | 408/200 |
| 619,450 | 2/1899 | Turton | 408/59 |
| 786,990 | 4/1906 | Phillips | 408/197 |
| 955,696 | 4/1910 | Ryder | 408/186 |
| 1,204,994 | 11/1916 | Kendall | 408/146 |
| 1,320,482 | 11/1919 | Lenker | 408/197 |
| 1,414,565 | 5/1922 | Gallagher | 408/116 |
| 1,702,485 | 2/1929 | Severson | 408/196 |
| 1,721,892 | 7/1929 | Wacker | 408/185 |
| 1,923,177 | 8/1933 | Tucker | 408/200 |
| 1,938,717 | 12/1933 | Oxford | 407/45 X |
| 1,951,101 | 3/1934 | Miller | 407/49 |
| 1,964,130 | 6/1934 | Miller | 407/37 X |
| 2,092,984 | 9/1937 | Muth | 408/229 |
| 2,102,478 | 12/1937 | Miller | 407/38 |
| 2,150,286 | 3/1939 | Miller | 29/105 |
| 2,155,595 | 4/1939 | Harten | 407/37 X |
| 2,380,517 | 7/1945 | Gordon | 408/143 |
| 2,391,794 | 12/1945 | O'Brien, Jr. | 408/57 |
| 2,606,464 | 8/1952 | Fleischer | 408/59 |
| 2,645,003 | 7/1953 | Thompson et al. | 407/46 |
| 2,690,610 | 10/1954 | Begle et al. | 407/36 |
| 2,775,821 | 1/1957 | Eipper et al. | 33/185 |
| 2,831,241 | 4/1958 | Bader et al. | 407/17 |
| 2,945,288 | 7/1960 | Berry, Jr. | 407/41 |
| 2,977,829 | 4/1961 | Thoma | 408/181 |
| 2,998,736 | 9/1961 | Cloutier et al. | 408/185 X |
| 3,125,799 | 3/1964 | Bennet | 408/226 X |
| 3,142,111 | 7/1964 | Turner . | |
| 3,203,493 | 8/1965 | Bergstrom | 407/39 X |
| 3,286,557 | 11/1966 | Rietzler et al. . | |
| 3,380,137 | 4/1968 | MacPetrie et al. . | |
| 3,490,315 | 1/1970 | Melchiorre . | |
| 3,498,164 | 3/1970 | Miko et al. | 82/37 |

(List continued on next page.)

FOREIGN PATENT DOCUMENTS

| | | | |
|---|---|---|---|
| 1435449 | 5/1976 | Fed. Rep. of Germany | 408/181 |
| 991283 | 5/1965 | United Kingdom | 408/179 |
| 1248800 | 10/1971 | United Kingdom . | |
| 1286913 | 8/1972 | United Kingdom . | |
| 1435339 | 5/1976 | United Kingdom . | |
| 1567078 | 5/1980 | United Kingdom . | |
| 1574455 | 9/1980 | United Kingdom . | |

OTHER PUBLICATIONS

SME Tool Engineer's Handbook, 2nd Edition, 1959, McGraw-Hill, pp. 29-20, 29-21.

Atkey, Reamer Cuts Down on Costs, 9-1979, Machinery and Production Engineering, pp. 59-61.

MAPAL—"Single Edge Precision Reamers with Replacable Cutting Blade",—to Produce Close Tolerance Bores with Low Micro Finishes Most Economically.

MAPAL—"Single Blade Precision Reamers with Throw-Away-Tip"—for the Economical Production of Accurate Bores.

Primary Examiner—Gil Weidenfeld
Assistant Examiner—Glenn L. Webb
Attorney, Agent, or Firm—Harness, Dickey & Pierce

[57] ABSTRACT

A reamer comprises a single, adjustable, elongate carbide blade clamped in position in an axial slot in the reamer periphery by means of a clamping plate, with the slot having a positive rake blade supporting fade so that the blade is adjustable along a line parallel to a tangent to the reamer periphery.

6 Claims, 2 Drawing Figures

U.S. PATENT DOCUMENTS

| | | | |
|---|---|---|---|
| 3,551,978 | 1/1971 | Berry, Jr. | 408/185 |
| 3,591,305 | 7/1971 | Aichhorn | 407/45 |
| 3,656,859 | 4/1972 | Rietzler et al. | 408/179 |
| 3,739,442 | 6/1973 | Lovendahl | 407/37 |
| 3,880,545 | 4/1975 | Kress | 408/153 |
| 4,011,025 | 3/1977 | Kress | 408/152 |
| 4,030,855 | 6/1977 | Kress | 408/226 |
| 4,076,445 | 2/1978 | Kress et al. | 408/226 |
| 4,102,594 | 7/1978 | Kress et al. | 408/226 |
| 4,125,342 | 11/1978 | Kress | 408/179 |
| 4,163,624 | 8/1979 | Eckie | 408/185 |
| 4,166,711 | 9/1979 | Kress et al. | 408/233 |
| 4,181,456 | 1/1980 | Oaks | 407/38 |
| 4,199,284 | 4/1980 | Kress et al. | 408/233 |
| 4,200,418 | 4/1980 | Kress et al. | 408/143 |
| 4,211,507 | 7/1980 | Kress et al. | 407/37 |
| 4,239,425 | 12/1980 | Striegl | 408/185 |
| 4,279,550 | 7/1981 | Kress et al. | 408/59 |
| 4,293,252 | 10/1981 | Kress et al. | 408/224 |
| 4,318,647 | 3/1982 | Erkfritz | 407/45 X |
| 4,344,724 | 8/1982 | Kress et al | 408/146 X |
| 4,353,669 | 10/1982 | Striegal | 408/185 |

REAMER WITH ANGLED BLADE AND FULL LENGTH CLAMP

This application is a continuation of application Ser. No. 417,399, filed Sept. 13, 1982 abandoned Aug. 23, 1984.

BACKGROUND OF THE INVENTION

This invention relates to a reamer of the kind comprising a single carbide blade—in contrast to a multiple number of such blades—which blade is adjustable so that the projection of the blade from the reamer periphery may be accurately set and also comprising at least one carbide burnishing pad at a location on the reamer periphery spaced from the blade. Such reamers, in providing adjustable cutting edge, ensure that the tolerance of the hole being reamed is maintained even on long production runs.

In a known embodiment of reamer, the blade is secured by a clamping plate which extends, for reasons of reamer geometry, over only part of the length of the blade, which does not provide a completely satisfactory clamping action for all working conditions. Furthermore, in known reamers, the blade is set radially with respect to the axis of rotation i.e. the blade has a zero rake, but in very many circumstances it is advantageous or even essential to give the leading face of the blade a positive cutting angle and this can only be effected by an awkward grinding operation on the front face of the blade.

Illustrative of prior art relative to reamers of the type of the present invention are disclosed in U.S. Pat. Nos. 786,990; 955,696; 991,283; 1,320,482; 1,702,485; 2,150,286; 2,155,595; 2,775,821; 3,125,799; 3,656,859; 3,880,545; 3,490,315; 4,076,445; and 3,125,342.

SUMMARY OF THE INVENTION

According to the present invention, there is provided a reamer comprising a single, adjustable, elongate, carbide blade clamped in position in an axial slot in the reamer periphery by means of a clamping plate, with the slot having a positive rake blade supporting face so that the blade is adjustable along a line parallel to a tangent to the reamer periphery and along a plane preferably disposed in a non-parallel relationship with a radial plane extending through the longitudinal axis of the reamer and through the outer edge of the cutting face of the blade. Thus, the blade is adjustable along a first plane that is not parallel to a second plane extending through the longitudinal axis and disposed at a positive angle relative to the above-mentioned radial plane.

Thus, the reamer in accordance with the invention, by virtue of the angled blade supporting face of the slot, automatically sets the blade with a positive rake, the blade normally having a trapezoidal cross-section with a longer, front cutting face and a shorter rear back face, the latter abutting the blade supporting face, and avoids blade grinding operations to give the blade a positive cutting face.

Preferably, the clamping plate takes the form of a single element although two or more shorter length elements may be provided. With either arrangement the blade is preferably clamped along the majority of its length. With the clamping plate(s) supporting most, if not all, of the length of the blade, there is provided an improved clamping effect over known proposals.

In detail, the blade supporting face may be positively raked at 10°. It will be appreciated that to make the reamer more universally usable, a simple grinding step on the leading face of the blade may be effected to give the particular angle e.g. 6° or even 0° required by the user for a particular reaming operation. The blade may be adjustable as to its projection beyond the reamer periphery by a pair of screws spaced apart along the reamer, one screw to bear at or adjacent each end of the blade. The or each clamping plate may also be secured by at least one screw. In one embodiment two spaced apart screws are provided, with the clamping plate provided with two suitably tapped holes. Conveniently, the clamping plate(s) clamps by a wedging action abutting the front face of the blade and an opposite, preferably angled, face of the slot.

DESCRIPTION OF THE PREFERRED EMBODIMENT

Figure 1:
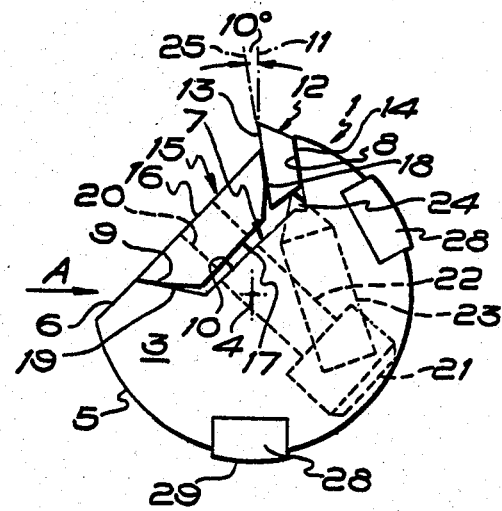
FIG. 1 is an end elevation of a reamer in accordance with the invention.
Figure 2:
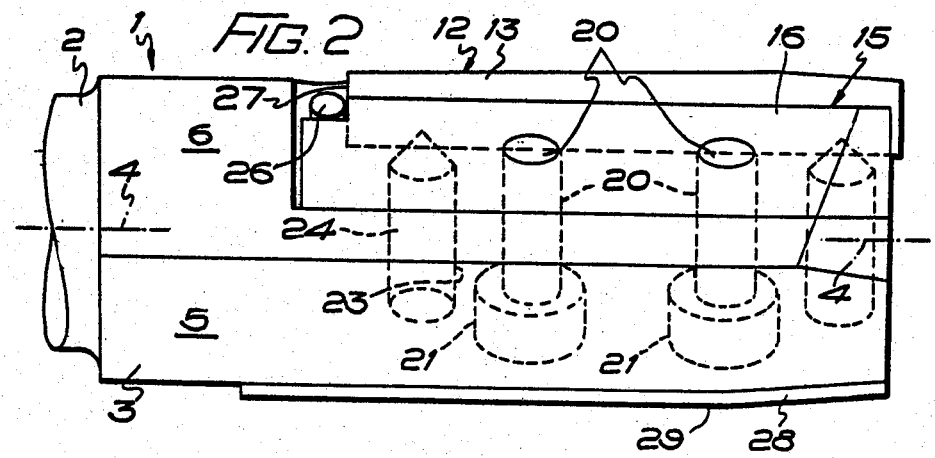
FIG. 2 is a side elevation of FIG. 1, in the direction of arrow A.

The invention will now be described in greater detail, by way of example, with reference to the accompanying drawings.

In the drawings, a reamer 1 comprises a shank 2 adapted to be clamped in a machine tool, and an integral head 3, the reamer 1 being rotatable by the machine tool about elongate axis 4.

The head 3 has a circular periphery 5 interrupted by a machined flat 6, and an axial slot 7 extending along the flat 6 defined by a blade supporting face 8, an opposite face 9 and a common interconnecting base 10. As best seen in FIG. 1, the blade supporting face 8 is positively raked at 10° with respect to a radius plane 11 extending from the axis of rotation 4. The opposite face 9 is also angled such that it, and the blade supporting face 8, together define a taper which narrows towards the centre of the head 3.

A single, elongate carbide blade 12, of trapezoidal cross-section having a longer front cutting face 13 and a shorter rear back face 14 which abuts the blade supporting face 8, is located within the slot 7 and is clamped against the blade supporting face 8 by means of a single element clamping plate 15 extending over the full axial length of the blade 12 and again of trapezoidal cross-section having a longer, front face 16 directed away from the slot 7 and a shorter, back face 17 directed into the slot 7, with angled end faces 18 and 19 abutting respectively the front cutting face 13 of the cutter 12 and the opposite face 9 of the slot 7.

As shown in FIG. 1, the supporting face 8 is preferably disposed in a non-parallel relationship with the radius plane 11 extending through the longitudinal axis 4 of the reamer body and through the outer edge of the cutting face 13 of the blade 12. Thus, the blade 12 is adjustable along a plane 25 that is not parallel to a plane that extends through the longitudinal axis 4 and that is preferably disposed at a positive angle relative to the radius plane 11.

The clamping plate 15 is provided with two spaced apart, tapped holes 20 each to receive a securing screw 21, the shank of which screw also passes through a hole 22 in the head 3. The latter is also provided with two further tapped, and spaced apart, holes 23 adjacent each end of the blade 12, each hole receiving an adjusting screw 24 to adjust the projection of the blade 12 beyond the periphery 5 of the head 3, not only for initial setting up of the reamer 1, but also for adjustment purposes after wear on the blade 12 has occurred by displacing the blade along the plane 25 parallel to a tangent to the reamer periphery. The slot 7 is also provided with a stop pin 26 against which one end face 27 of the blade 12 is located, while the head 3 is also provided with a pair of peripherally spaced burnishing pads 28 having faces 29 projecting beyond the periphery 5, the pads 28 being spaced apart circumferentially and spaced from the blade 12.

We claim:

1. A reamer comprising a reamer body, a single adjustable, axially-elongated blade with an axially-elongated front cutting face, an axially-elongated outer cutting edge, and an axially-elongated rear planar face thereon parallel to said front cutting face, said blade having a generally trapezoidal lateral cross-section with its front cutting face being wider than its rear planar face, said blade being clamped by a clamping plate in a generally axially-extending slot in the periphery of said reamer body, said clamping plate extending over substantially the axial length of said blade, said slot having a planar positive rake blade supporting face extending generally axially in said slot in said reamer body and being generally parallel to the longitudinal axis of said reamer body, said planar supporting face in said reamer body being generally flatly engaged directly by said axially-elongated rear planar face of blade for slidable adjusting movement of said blade therealong and being disposed in a non-parallel relationship with a radial plane extending through the longitudinal axis of said reamer body and through said outer cutting edge of said cutting face of said blade so that the radial position of said outer cutting edge of said blade is adjustable along a first plane parallel to said planar supporting face and parallel to a second plane extending through the longitudinal axis of said reamer body and disposed at a positive angular relationship relative to said radial plane, said radial position of said outer cutting edge of said blade being adjustable by a pair of screws spaced apart along the reamer body and in threadable engagement therewith, one of said screws abuttingly bearing on said blade at or adjacent each end of the blade, and said clamping plate wedgingly engaging the front cutting face of the blade and clampingly urging said blade into said generally flat direct engagement of said rear planar face with said planar supporting face in said reamer body in order to maintain said outer cutting edge in an accurate radial position and in an accurate and constant positive rake angular relationship with said reamer body regardless of the radial position of said outer cutting edge.

2. A reamer as claimed in claim 1, wherein the clamping plate comprises only a single element securable directly to the reamer body by fastener means.

3. A reamer as claimed in claim 1, wherein the clamping plate comprises two or more elements, each of said elements being securable directly to the reamer body by fastener means, and each of said elements directly and clampingly engaging said blade.

4. A reamer as claimed in claim 1, wherein the blade supporting face is positively raked at 10° relative to said radial plane.

5. A reamer as claimed in claim 1, wherein the opposite face of said slot is angled.

6. A reamer comprising a reamer body, a single adjustable, axially-elongated blade with an axially-elongated front cutting face, an axially-elongated outer cutting edge, and an axially-elongated rear planar face thereon, wherein said front cutting face is defined by a planar surface disposed in a first plane parallel to one of a second plane encompassing the rear planar surface of the blade or a third plane intersecting said second plane parallel to the rear planar surface of the blade along a line disposed outside of the cutting diameter of the tool, said blade being clamped by a clamping plate in a generally axially-extending slot in the periphery of said reamer body, said clamping plate extending over substantially the axial length of said blade, said slot having a planar positive rake blade supporting face as one stationary surface of said slot and extending generally axially in said slot in said reamer body and being generally parallel to the longitudinal axis of said reamer body, said planar supporting face in said reamer body being generally flatly engaged directly by said axially-elongated rear planar face of blade for slidable adjusting movement of said blade therealong perpendicular to said axial movement and being disposed in a non-parallel relationship with a radial plane extending through the longitudinal axis of said reamer body and through said outer cutting edge of said cutting face of said blade so that the radial position of said outer cutting edge of said blade is adjustable along a first plane parallel to said planar supporting face and parallel to a second plane extending through the longitudinal axis of said reamer body and disposed at a positive angular relationship relative to said radial plane, said radial position of said outer cutting edge of said blade being adjustable by a pair of screws spaced apart along the reamer body and in threadable engagement therewith, one of said screws abuttingly bearing on said blade at or adjacent each end of the blade, and said clamping plate wedgingly engaging the front cutting face of the blade and clampingly urging said blade into said generally flat direct engagement of said rear planar face with said planar supporting face in said reamer body in order to maintain said outer cutting edge in an accurate radial position and in an accurate and constant positive rake angular relationship with said reamer body regardless of the radial position of said outer cutting edge.

* * * * *